Patented May 15, 1934

1,958,615

UNITED STATES PATENT OFFICE 1,958,615

PROCESS OF MAKING COLORED CEMENT

John Finn, Jr., Berkeley, Calif., assignor of one-half to Frederick H. Meyer, San Francisco, Calif.

No Drawing. Application October 19, 1932, Serial No. 638,528

5 Claims. (Cl. 106—25)

This invention relates to colored Portland cement and has for its objects a process for producing permanent colors directly within the cement or clinker particles by chemical action, and also a cement so produced.

It is known that varying amounts of iron or iron salts in the cement materials influence the color of the cement, but apart from shades of color inclining toward brown, no important variation in color has been produced by this means, and in experimenting to produce decided green and blue shades I have discovered that additions of sulphur to the cement or cement clinker followed by reheating for a protracted period of time induces a reaction of some sort with the cement ingredients whereby fine greens and blues may be produced, and even reddish browns and yellows. The reaction is thought to be somewhat similar to that in producing artificial lapis lazuli.

In carrying out my process I may take ordinary Portland cement, or I may take the clinker before grinding, mix a small quantity of sulphur (from about 1 to 4 per cent by weight) and heat the mixture to about 800 to 1600 degrees F. maintained for several hours free from contact with oxygen, to produce decided green colors in the clinker or cement. To obtain a good blue, the material was heated to about 1500° F. for three hours with 3% of flowers of sulphur in a crucible covered with a clay plug, the plug removed and a small additional amount of sulphur (1%) added, the crucible at once closed again and the temperature raised to about 1600° F. for about half an hour, then the crucible was removed and cooled. With cement this produced a good blue, but with clinker the color was a bright green extending entirely through the clinker bodies. Upon admission of air to the mass during heating the final color was a reddish Van Dyke brown. With less sulphur and higher heat the color was yellow.

The amount of sulphur used, duration of heat application and temperature together with the admission or more or less air, or its total exclusion, all have an influence on the color.

An analysis of a Portland cement treated as above with about 3% of sulphur showed the following:

| | Per cent |
|---|---|
| Silica | 23.06 |
| Iron | 1.60 |
| Alumina | 2.68 |
| Lime | 65.38 |
| Ignition loss (sulphur and other volatiles) | 4.33 |

After treating, the material is ground to cement fineness, with or without gypsum, for set control, and concrete and cement work made from the cement shows good strength and a color which appears proof against the action of sunlight and the destructive influences present in air, as well as the effect of free lime.

When the process is practiced with naturally light colored cements, or cements containing various ingredients giving them a distinctive color, the result is a combination between the several influences, but with a cement containing the normal ingredients generally present in Portland cement the results obtained are substantially as described.

I claim:—

1. The process of making colored cement which comprises heating Portland cement with additions of sulphur to a degree and for a period of time and with substantial exclusion of air to produce the desired color therein.

2. The process of making colored cement which comprises heating Portland cement clinker with additions of sulphur to a degree and for a period of time and with substantial exclusion of air to produce the desired color therein.

3. The process of making colored cement which comprises heating Portland cement or clinker with additions of sulphur to a temperature substantially above 800° F. for a period of time and with substantial exclusion of air to produce the desired color therein.

4. The process of making colored cement which comprises heating Portland cement or clinker with from $\frac{1}{10}$% to 5% of sulphur to a temperature from 800° F. to 1800° F. for a periof of time and with substantial exclusion of air to materially change the color of the cement or clinker, and then adding an additional quantity of sulphur to further modify the color produced.

5. The process of making colored cement which comprises heating Portland cement with sulphur to a temperature substantially above 800° F. for a period of time and with substantial exclusion of air to materially change the color of the cement, then adding more sulphur to the heated mixture and maintaining the temperature above 800° F. for an additional period of time to further modify the color produced.

JOHN FINN, JR.